July 29, 1969  E. G. FREESE  3,458,224

WELD JOINT

Filed Jan. 10, 1968

INVENTOR.
EVANS G. FREESE
BY *Hubert Miller*
ATTORNEY

United States Patent Office 3,458,224
Patented July 29, 1969

3,458,224
WELD JOINT
Evans Glenn Freese, Hutchinson, Kans., assignor to The Cessna Aircraft Company, Wichita, Kans., a corporation of Kansas
Filed Jan. 10, 1968, Ser. No. 696,889
Int. Cl. F16b 1/00, 5/08
U.S. Cl. 287—189.36          7 Claims

ABSTRACT OF THE DISCLOSURE

A combination weld joint used to attach a cylinder head to a cylindrical pressure vessel in such a manner as to enable a portion of the tensile stress carried by the cylinder head to be taken up in shear by the stronger weld material. The weld joint extends from the outer surfaces of the cylinder head and wall inwardly into a circumferential groove in the cylinder head a sufficient distance that a portion of the weld metal is placed in shear when the vessel is under pressure.

Background of the invention

In some of the recent designs of hydraulic cylinders, the structure has been simplified by welding the cylinder head directly to the barrel member thus avoiding sealing problems and the related additional structure. The type of joint used has been a butt weld between the abutting edges of the head and cylinder barrel with the area of the cylinder head surrounding the weld being under tensile stress when the cylinder is pressurized. Due to the required working pressures and available designs it has been necessary in the past to construct both cylinder barrel and head of steel.

Summary of the invention

The invention is a weld joint connecting a cylinder head to the cylinder which extends from the outer surface of the cylinder head and wall a sufficient distance inward of the cylinder head that a portion of the head is placed under a compressive rather than tensile loading. With the use of the weld joint of the persent invention, metals having less tensile strength such as cast or ductile nodular iron can be utilized in the cylinder heads in place of steel, at an obvious cost saving. This improved combination joint enables a good portion of the tensile load usually carried by the cylinder head to be taken up in shear by the stronger weld material in the joint. In effect, the joint transfers most of the stress load to the stronger of the two base metals in the joint.

It is therefore the principal object of the present invention to provide a new and improved weld joint for joining the cylinder head to the barrel of a hydraulic cylinder.

Another object of the invention is to provide a combination weld joint that absorbs both a tensile and a shear load.

An additional object of the invention is to provide a weld joint of increased strength, between two base metals, which distributes the stress load over a larger area.

A further object of the invention is to provide a weld joint of increased strength between two base metals, one having less tensile strength than the other, by transferring a portion of the tensile load on the weaker base metal to a compressive load on the stronger weld metal.

Another object of the invention is to provide a weld joint having a convex curvature at the root of the joint.

Still another object of the invention is to provide a weld joint for joining base metals of cast iron and steel.

The invention, together with other objects which will become apparent, will be more clearly understood when the following description is read in connection with the accompanying drawings in which.

Figure 1:
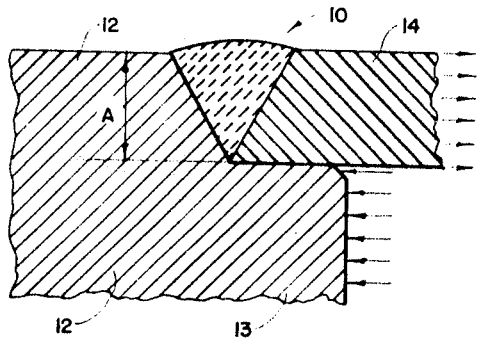
FIG. 1 is a partial longitudinal sectional view through a cylinder head and cylinder wall joint in accordance with the teachings of the prior art.

Referring now to the drawings for a detailed description of the invention, attention is directed to FIG. 1 which illustrates a prior art method of welding the head to a hydraulic cylinder. The butt weld joint 10 connects a cylinder head 12 to a cylinder 14 with a reduced diameter portion 13 of the head 12 extending into the end of the cylinder. When the cylinder is under a pressure load as indicated by the arrows, the weld joint 10 and its connected members 12 and 14 are placed under high tension. The area A indicates the approximate portion of the cylinder head which is carrying the tensile load under such conditions.

Figure 2:
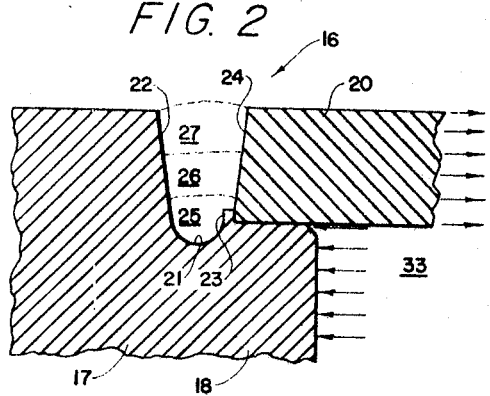
FIG. 2 is a partial longitudinal sectional view through a cylinder head and cylinder wall joint in accordance with the present invention.
Figure 3:
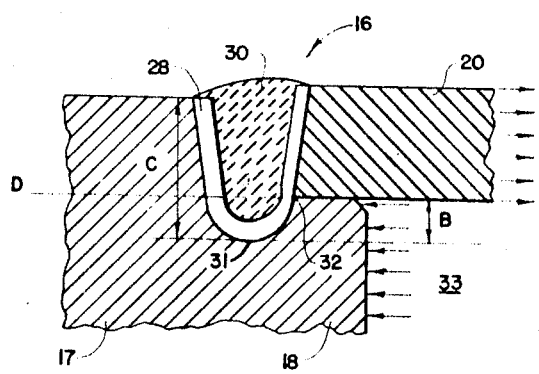
FIG. 3 is a similar view of FIG. 2 showing the fusion of the metals in the completed welded joint.

A weld joint embodying my invention is shown in FIGS. 2 and 3.

The inner end 18 of the cylinder head 17 has a reduced diameter to fit snugly into the open bore of cylinder 20. The inner end of the cylinder head 17 is also provided with a circumferential arcuate bottom groove 21 having a diverging side wall 22. The open end of cylinder 20 is provided with an outwardly sloping surface 24, which constitutes the other side wall of the groove 21. Groove 21 is of sufficient depth to undercut the cylindrical surface of the reduced diameter end 18 for a considerable distance, as shown. Thus, when the cylinder head inner end 18 is inserted into the cylinder 20 a deep circumferential groove 21 is provided, having diverging side walls 22 and 24.

While it is not essential to the formation of the completed weld joint, it is preferable to provide a means of limiting the depth of penetration of the cylinder head into the bore of the cylinder, preparatory to welding. In the joint illustrated, such a means is in the form of a small integral circumferential ridge which constitutes a limit stop 23. Alternatively, a similar stop (not shown) could be provided on the interior surface of the cylinder.

After the head 17 and cylinder 20 have been positioned as shown in FIG. 2, weld metal is applied in groove 21 in three or more passes, as indicated by broken lines, and identified by the numerals 25, 26 and 27.

During the build-up of weld metal in groove 21, a zone of fusion 28 is formed, the limit stop 23 is fused, and the joint is provided with a well rounded and relatively thick root 31, as clearly shown in FIG. 3. The root projects inwardly a distance B beyond the outer cylindrical surface 32 of the inner end 18 of head 17, and this is an important feature of my invention.

After the head 17 has been welded in position on the end of cylinder 20, as described, high pressure in the interior 33 of the closed cylinder exerts force on the cylinder wall 20 and on the cylinder head 17 in opposing directions, as indicated by the two sets of arrows. Force applied against the inner surface of the head in the annular area B acts in compression against the root 31 of the weld joint and acts in shear along the line D, through the weld joint.

Since the weld metal 30 and the fused metal 28 have much greater strength than the metal in head 17, and since the undercut root 31 converts a considerable portion of the tension load on the head into a compression load, a weld joint of the described construction results in a very considerable decrease in tension load per unit area. A further decrease in tension load per unit of head area is provided because the tension load is distributed over the greater area C, rather than over the much smaller area A (FIG. 1), provided by a conventional weld joint.

The joint of this invention is in effect a combination tension, shear and compression joint because of the manner in which it absorbs and distributes the load applied to the two weld joined parts in opposite directions. The undercut root 31, and its well rounded root shape, minimize the possibility of fatigue cracks along the line D. The joint makes possible the use of a cylinder head made of a metal having relatively low tensile strength, rather than a head of high tensile strength metal such as steel, and without sacrificing the pressure capability and service life of the complete cylinder.

Having described the invention with sufficient clarity to enable those familiar with this art to construct and use it, I claim:

1. A combination tension and shear weld joint comprising:
   a first and a second base metal (20 and 17) each having edge surfaces (22 and 24) in spaced juxtaposed relation, the second base metal having a portion (18) lapping a portion of the first base metal,
   groove means (21) in the second base metal undercutting the lapping portion (18) and positioned between said edge surfaces, and defining the root of the weld joint, and
   weld metal (30) filling the groove means, joining said edge surfaces and forming a joint that undercuts one of the base metals and acts in both tension and shear, the second base metal (17) having less tensile strength than the first base metal (20), and the weld metal having greater tensile strength than the second base metal.

2. A combination weld joint as described in claim 1, and stop means carried by one of the base metals for limiting the extent of lap of one base metal with respect to the other, to thus position the two base metals prior to welding.

3. A combination weld joint as set forth in claim 1 wherein the groove means defining the weld root has a substantial radius to prevent cracking of the joint.

4. A welded end assembly for hydraulic cylinders comprising:

a cylinder member (20) having a weldable edge surface (24) at its open end;
   a cylinder head member (17) having a reduced diameter outer end portion (18) received in the open end of the cylinder, the reduced diameter portion terminating in an outwardly extending shoulder (22) spaced in juxtaposed relation to the edge surface (24) of the cylinder; and
   circumferential groove means (21) undercutting the reduced diameter portion of the head at the juncture with the extending shoulder (22), and defining the root of the weld joint with the weld metal extending outwardly therefrom joining the edge surfaces (22 and 24);
   the cylinder head being composed of a metal having less tensile strength than that of the cylinder, and the weld metal being of greater tensile strength than that of the cylinder head metal.

5. A welded end assembly as set forth in claim 4 wherein the extending shoulder (22) of the head and the edge surface (24) of the cylinder constitute diverging side walls of said groove means (21).

6. A welded end assembly as set forth in claim 4 and integral stop means carried by one of the members for limiting the extent of penetration of the cylinder head member into the open end of the cylinder member, to thus position the two members prior to welding.

7. A welded end assembly as set forth in claim 4 wherein the composition of the cylinder head is cast iron while the cylinder is steel.

References Cited

UNITED STATES PATENTS

| | | | |
|---|---|---|---|
| 920,743 | 5/1909 | Hines | 29—483 X |
| 1,545,036 | 7/1925 | Culhane et al. | |
| 1,853,112 | 4/1932 | Boltz | 220—67 |
| 3,183,066 | 5/1965 | Lessmann et al. | 29—482 X |

RAMON S. BRITTS, Primary Examiner

U.S. Cl. X.R.

29—483; 219—137; 220—3; 285—286